UNITED STATES PATENT OFFICE.

REES B. SMITH, OF MOUNT PLEASANT, OHIO.

IMPROVED COMPOSITION FOR ROOFING.

Specification forming part of Letters Patent No. 56,818, dated July 31, 1866.

*To all whom it may concern:*

Be it known that I, REES B. SMITH, of Mount Pleasant, in the county of Jefferson and State of Ohio, have made a new and useful Composition for Roofing Purposes; and I do hereby declare the following to be a full, clear, and exact description of the nature of the same, sufficient to enable one skilled in the art to which it is allied to make and compound the same.

The principal ingredient in this compound consists of a mineral found in some abundance in the county of Jefferson and some adjoining counties in the State of Ohio, and which is locally known as "Smith's mineral." This substance is ground into fine powder and mixed with coal-tar in almost the proportions of five parts mineral and two parts tar, though these proportions may be slightly varied, so long as the composition is made to retain such a plastic character as to be readily brushed onto a surface or spread thereon by a trowel.

The mineral which forms the base of the compound is a reddish-brown ferruginous earth of about the weight of an ordinary quality of iron ore, is insoluble in water, fusible at a high heat, and is found by analysis to consist as follows:

| | |
|---|---:|
| Silica | 37.35 |
| Peroxide of iron | 7.50 |
| Alumina | 12.70 |
| Lime | 4.98 |
| Magnesia | 10.31 |
| Carbonic acid | 15.25 |
| Water | 12.00 |
| | 100.09 | which may be expressed as—

| | |
|---|---:|
| Hydrous silicate of iron and alumina | 69.55 |
| Carbonate of lime | 8.98 |
| Carbonate of magnesia | 21.65 |
| | 100.18 |

This mineral, being ground, is mixed with coal-tar, and the composition is spread by a brush or trowel in a thin coating upon the surface of the roof, whether the latter consists of shingles, boards, paper, or cloth, and the material affords a water-proof surface of sufficient tenacity to avoid cracking under changes of the temperature.

Having described my invention, what I claim therein as new, and desire to secure by Letters Patent, is—

The composition for roofing consisting of the ingredients in about the proportions described.

REES B. SMITH.

Witnesses:
    JOHN W. HARRIS,
    JOHN EYEARS.